United States Patent [19]
Hoffman

[11] 4,392,398
[45] Jul. 12, 1983

[54] WIRE TRIMMER

[76] Inventor: Jerzy Hoffman, 204 Washington Blvd., Santa Monica, Calif. 90406

[21] Appl. No.: 268,401

[22] Filed: May 29, 1981

[51] Int. Cl.³ .............................................. H02G 1/12
[52] U.S. Cl. ...................................... 81/9.51; 30/90.1
[58] Field of Search .................. 30/90.1, 90.2, 91.2; 81/9.51, 9.5 R; 144/28.6, 28.7, 28.71, 28.72

[56] References Cited
U.S. PATENT DOCUMENTS

| | | | |
|---|---|---|---|
| 2,239,755 | 4/1941 | Montgomery | 81/9.51 |
| 3,241,407 | 3/1966 | Oehlerking | 81/9.51 |
| 3,620,104 | 11/1971 | Horrocks | 30/90.1 |

Primary Examiner—Robert C. Watson
Assistant Examiner—Douglas D. Watts
Attorney, Agent, or Firm—Philip Hoffman

[57] ABSTRACT

A rotating trimmer in a wire trimming machine is shown comprising a cylindrical trunk with a champhered bore for receiving an insulated wire or coaxial cable, and an open midsection for evacuating the trimmed insulation from the wire. The edge of a cutting tool is located in a slot adjacent the midsection to engage and trim the wire. The mass of the trimmer is symmetrically distributed about the longitudinal axis for uniform rotation and trimming.

4 Claims, 9 Drawing Figures

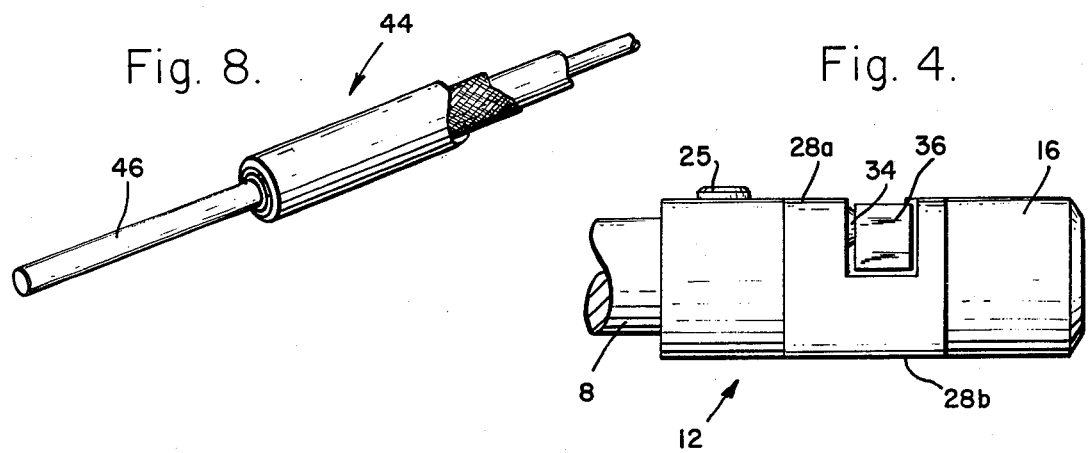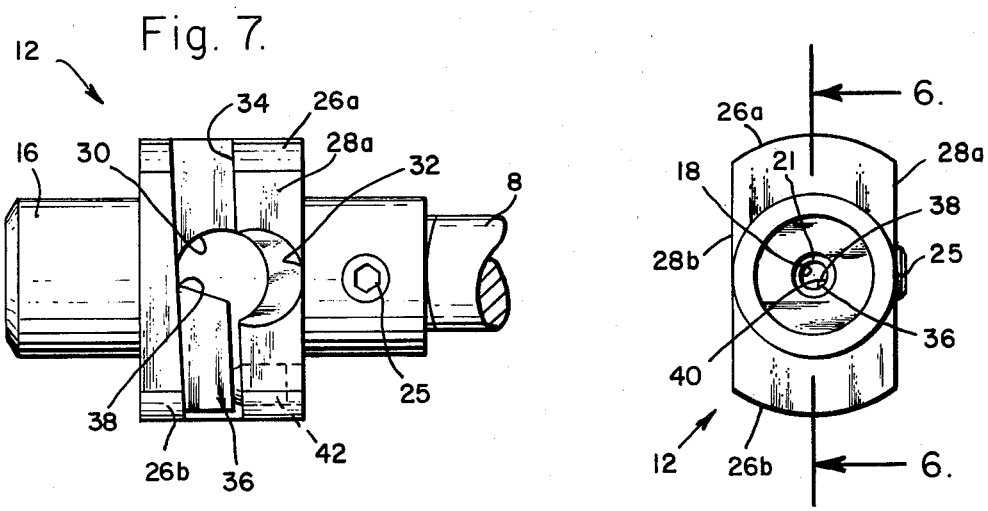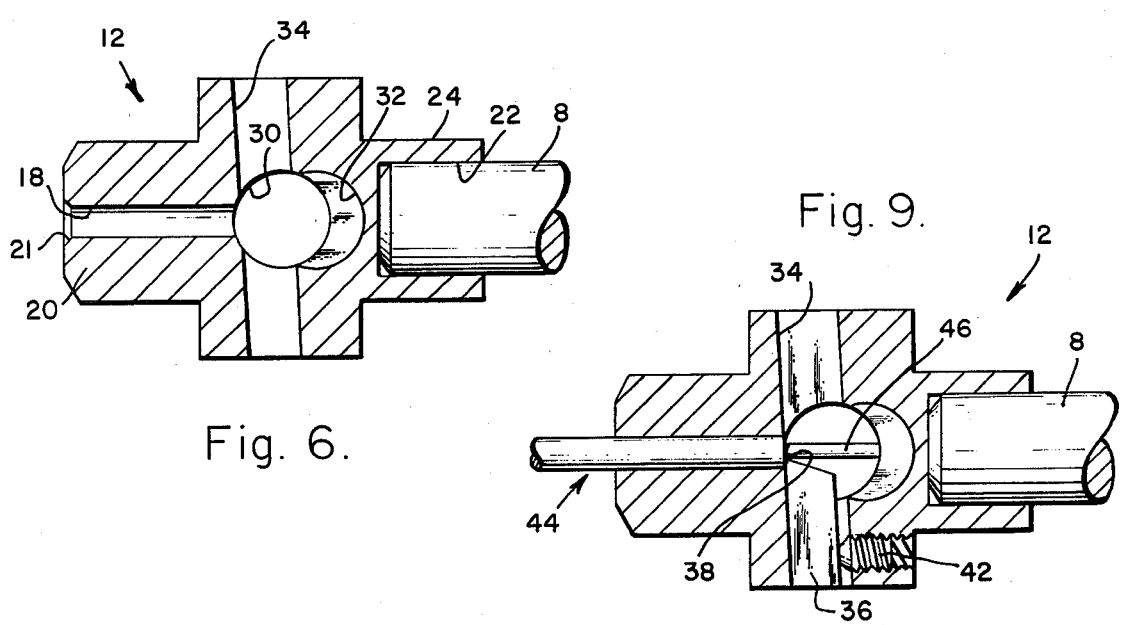

WIRE TRIMMER

BACKGROUND OF THE INVENTION

1. Field of the Invention

This invention relates generally to rotary wire stripping machines for stripping insulation from wires and coaxial cables, and more particularly to cutting mechanisms associated therewith. Specifically it relates to a rotary cutting head with a single fixed-position cutting tool.

2. Description of the Prior Art

Wire stripping machines and apparatus are well known in the art. Typically a variable position blade arrangement is taught wherein multiple blades adjust to the size of the wire. This adjustment is made while the stripping is in progress. Since these are typically rotary strippers, on occasion an eccentric acceleration will be introduced causing momentary disalignment of the blades from their desired cutting position. This, in turn, causes damage to the wire, and the stripping is not accomplished.

The current invention recognizes the need for reliable wire stripping of uniform wires and cables, such as are specified in military specifications. Accordingly, the present invention improves on the prior art particularly in the realm of reliability, and in other ways, as discussed below.

SUMMARY OF THE INVENTION

In view of the foregoing factors and conditions characteristic of the prior art it is an object of the present invention to provide a reliable coaxial cable trimmer.

It is another object of this invention to provide a rotary trimmer whose rotary cutting head has stable rotational characteristics.

It is yet a further object of this invention to provide a cable trimmer whose cutting tool is fixed relative to the cutting head.

Still another object of the present invention is to provide a rotary trimmer that can reliably trim wire or coaxial cable.

These and other objects and advantages are provided by a wire trimmer seated on a shaft rotated by a motor. The trimmer comprises a cylindrical trunk with a first cylindrical bore in one end thereof coaxial with the longitudinal axis thereof, a second cylindrical bore in the other end thereof and coaxial with said longitudinal axis and just large enough to receive the shaft, a transverse third cylindrical bore on one side of the trunk ending at the longitudinal axis, and a transverse fourth cylindrical bore on the opposite side of the trunk parallel to and eccentric of the third bore and ending at the longitudinal axis, the longitudinal axis being coplanar with the longitudinal axes of said transverse bores; a pair of arcuate flange portions disposed centrally and circumferentially about the trunk and opposite each other, the ends of the flange portions terminating in parallel planes which are tangent to, and which define opposite parallel sides of the trunk; a slot in one side of the trunk extending through the arcuate flanges and to the center of the trunk, the slot forming an acute angle with the longitudinal axis of the trunk; and a cutting member disposed in one end of the slot and having a beveled cutting edge located at the inner termination of the first bore.

The features of the present invention which are believed to be novel are forth with particularity in the appended claims. The present invention, both as to its organization and manner of operation, together with further objects and advantages thereof, may best be understood by making reference to the following description, taken in conjunction with the accompanying drawings in which like-referenced characters refer to like elements in the several views.

BRIEF DESCRIPTION OF THE DRAWINGS

FIG. 4 is a plan view of the head shown in FIG. 2;

FIG. 5 is an end view of the head as shown in FIG. 3;

FIG. 6 is a cross-sectional view of the head of FIG. 5 taken along section 6—6;

FIG. 7 is an elevational vies of the head of FIG. 6;

FIG. 8 is a piece of conventional coaxial cable trimmed by the invention; and

FIG. 9 is a partial sectional view of the head with the cable in trimming position.

DESCRIPTION OF THE PREFERRED EMBODIMENTS

Figure 1:
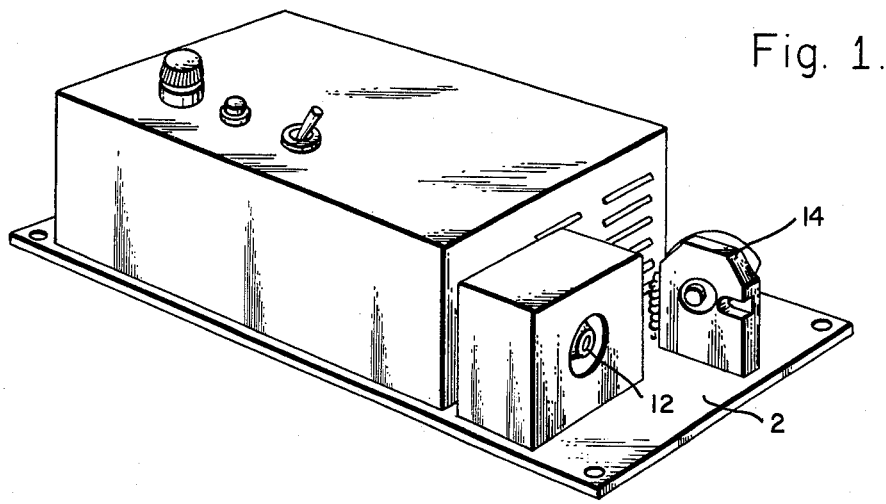
FIG. 1 is a perspective view of an embodiment of the invention.
Figure 2:
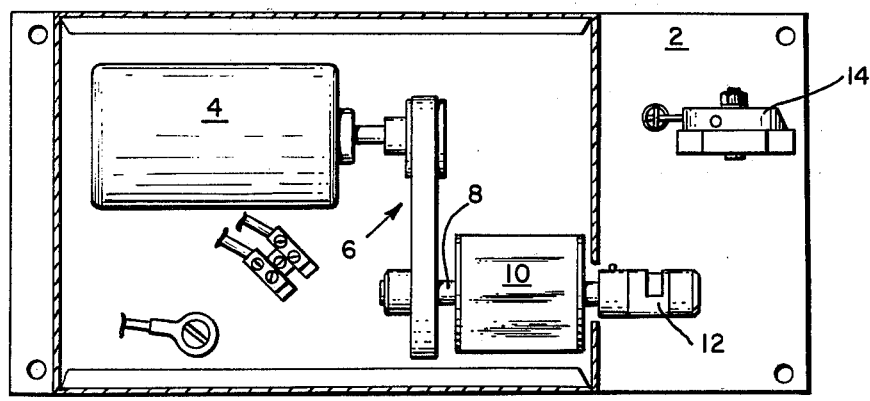
FIG. 2 is a plan view of the embodiment shown in FIG. 1 with the guard cover removed.
Figure 3:
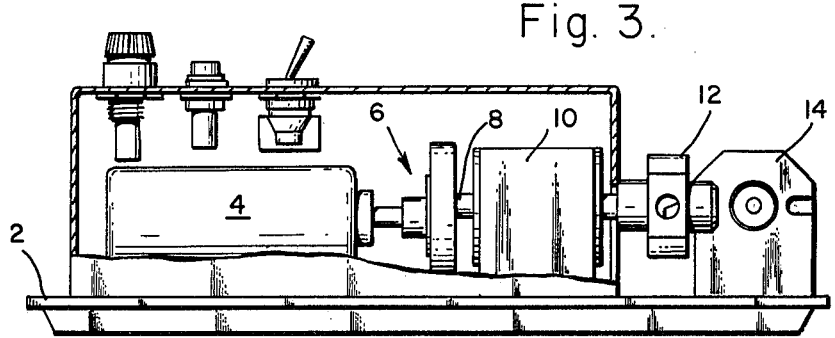
FIG. 3 is an elevational view of the embodiment shown in FIG. 2.

Referring now to the drawings there is shown in FIGS. 1-3 a wire trimming machine comprising a base 2 on which are mounted a motor 4, a belt-driven speed reduction gear assembly 6, a shaft 8 secured to said gear at one end and rotatably disposed in a support housing 10, and a trimmer 12 seated on the other end of said shaft 8. Also mounted on the base 2 is a conventional cable dressing device 14 which neatly cuts the end of the cable to a desired fixed length after the insulation has been trimmed.

FIGS. 4-7 and 9 show the head 12 in greater detail. The trimmer 12 is formed from a single solid piece of material and comprises a trunk 16 with a first cylindrical bore 18 at one end 20 thereof having a chamfer 21 and a second cylindrical bore 22 at the other end 24 thereof. Bore 22 provides the seating for the trimmer 12 on said other end of said shaft 8, said first and second bores being coaxial with the longitudinal axis of said trunk 16. A set screw 25 secures the trimmer 12 to the shaft 8.

Disposed circumferentially opposite each other about the center of the trunk 16 are a pair of arcuate flange portions 26a and 26b whose ends terminate in parallel planes which are tangent to, and which define opposite parallel sides 28a and 28b of the trunk 16 and of the trimmer 12. In the middle of one side 28a of the trimmer 12 is a third cylindrical bore 30 transverse to, and extending to the longitudinal axis of the trunk 16. In the opposite side 28b and midway between the arcuate flanges 26 is a fourth cylindrical bore 32 also transverse to, and extending to the longitudinal axis of the trunk 16, but eccentric of the third bore 32, the eccentricity being toward the other end 22 of the trunk 16.

A diagonal slot 34 is formed in the one side 28a of the trimmer 12 at a slight angle of approximately 5° with the vertical as shown in FIGS. 6, 7 and 9. The slot 34 extends through both arcuate flanges 26 and into the side 28a to a depth equal to that of the fourth bore 32.

A cutting tool 36 is disposed in the slot 34 with its cutting edge 38 disposed so that its inner corner 40 is a certain desired distance from the longitudinal axis of the trunk 16. The aforesaid desired distance is essentially the radius of the inner conductor of the coaxial cable to be trimmed (or the radius of the wire, as the case may be). It is this corner 40 that cuts away the insulation as the head 12 spins. Once the tool 36 is positioned in the slot 34 as desired, it is secured therein by a set screw 42 which can be permanently set, if desired, with epoxy.

FIG. 8 shows a typical coaxial cable 44 whose inner conductor 46 has been trimmed of insulation by the invention. The operation of the invention is straightforward. The cable (or wire) is inserted in a conventional collet handle with the portion to be trimmed extending forward therefrom. The invention is equipped with conventional circuitry to operate the motor 4. When the motor is turned on the rotation is communicated to the shaft 8 via the speed reduction gear assembly 6, causing the trimmer 12 to rotate at a desired speed.

The operator grips the collect handle and inserts the protruding cable into the champhered bore 18. Having the champher 21 at the mouth of the bore 18 facilitates insertion of the cable. As the trimmer 12 rotates, the corner 40 engages and trims the insulation as the cable is pushed inward until the cable is trimmed as required, as is shown in FIG. 9. The trimmed cable is removed from the bore 18 and inserted in the dressing device 14 to neatly cut the end thereof. Now the cable is ready for use.

The transverse bores 30 and 32 are provided to give the insulation room for evacuation from the cutting edge. If they were not provided, the insulation would accumulate around the cutting tool 36 and impede the operation. The slot 34 is at an angle in order to have the corner 40 leaning into the insulation as the cable moves forward. This provides for easier engagement of the insulation by the cutting corner 40. The trimmer is geometrically symmetrical about its longitudinal axis to ensure uniform rotation, and therefore, uniform trimming. This is accomplished by having the transverse bores 30 and 32 and the slot 34 designed so that when the cutting tool 36 is in place, the mass distribution is symmetrical about the longitudinal axis.

There has thus been shown and described a wire trimmer. Although specific embodiments of the invention have been described in detail, other variations of the embodiments shown may be made within the spirit, scope and contemplation of the invention.

Accordingly, it is intended that the foregoing disclosure and drawings shall be considered only as illustrations of the principles of this invention and are not to be construed is a limiting sense.

What is claimed is:

1. In a wire trimming machine having a motor and a rotatable shaft rotated by said motor, a trimmer comprising:
    a cylindrical trunk with a first cylindrical bore in one end thereof coaxial with the longitudinal axis thereof, a second cylindrical bore in the other end thereof coaxial with said longitudinal axis and just large enough to receive said shaft, a transverse third cylindrical bore on one side of said trunk ending at said longitudinal axis, and a transverse fourth cylindrical bore on the opposite side of said trunk prallel to and eccentric of said third bore and ending at said longitudinal axis, said longitudinal axis being coplanar with the longitudinal axes of said transverse bores;
    a pair of arcuate flange portions disposed centrally and circumferentially about said trunk and opposite each other, the ends of said flange portions terminating in parallel planes which are tangent to and which define opposite parallel sides of said trunk;
    a slot in said one side of said trunk extending through both said arcuate flanges and from the circumference to the center of said trunk, said slot forming an acute angle with said longitudinal axis of said trunk; and
    a cutting member disposed in one end of said slot and having a beveled cutting edge located at the inner termination of said first bore.

2. The trimmer claimed in claim 1 wherein the mass distribution of said trimmer is symmetrical about said longitudinal axis of said trunk.

3. The device claimed in claim 2 wherein the body of said trimmer is formed from a single solid piece of material.

4. The device claimed in claim 1 further comprising securing means for securing said cutting member in said slot, said securing means being disposed in that arcuate flange defining said one end of said slot.

* * * * *